Patented June 20, 1933

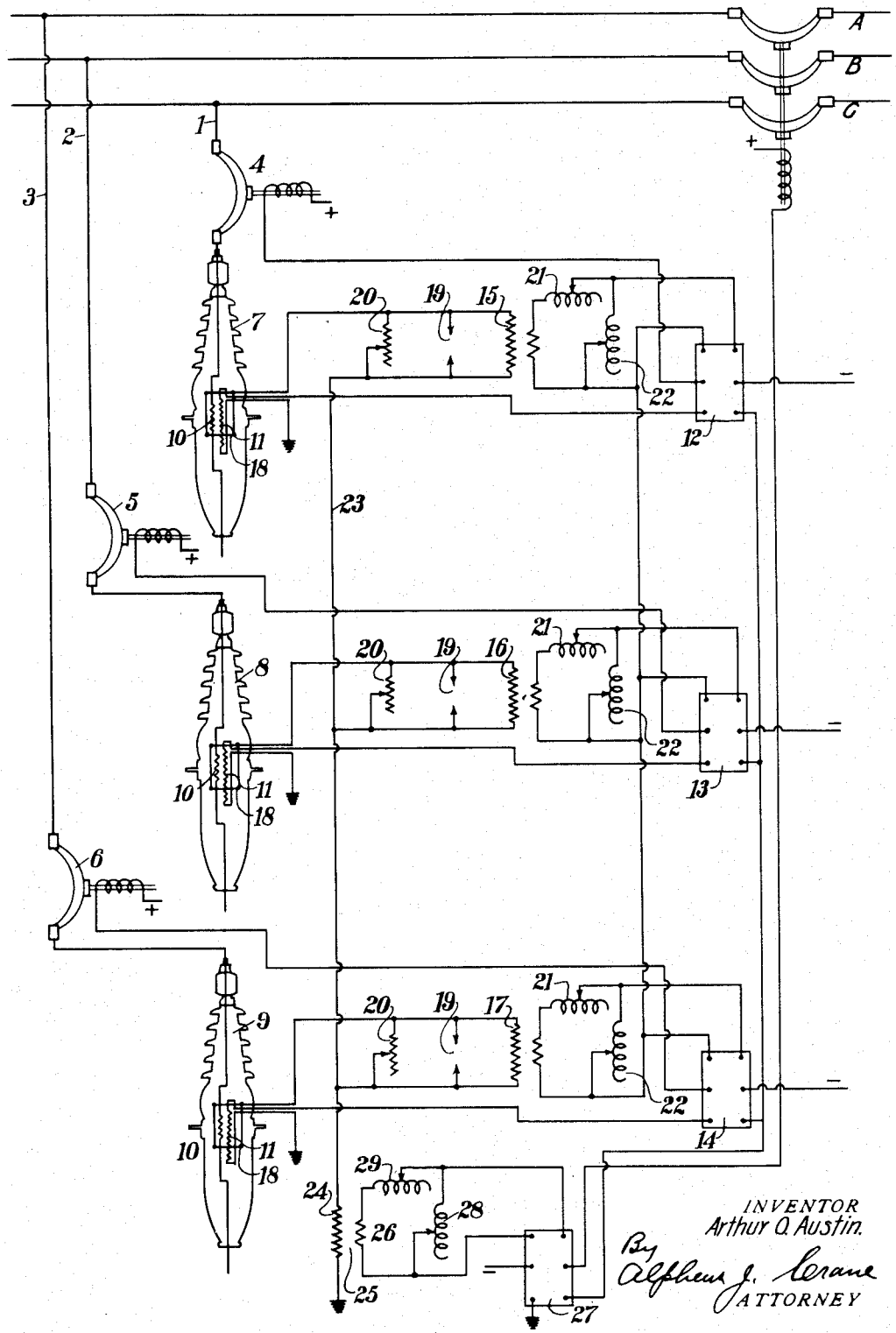

1,914,396

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

TRANSMISSION SYSTEM

Application filed February 24, 1931. Serial No. 517,821.

This invention relates to apparatus for diverting comparatively small amounts of energy from high potential transmission lines for the purpose of operating relays or other apparatus and has for one of its objects the provision of means for operating a relay or other apparatus which may be continuously connected with the line but which will divert energy therefrom only at such a time as energy is required.

A further object is to provide couplings with a transmission line having conductors of different phases, the couplings being connected to a common conductor from which energy is derived under unbalanced conditions of the transmission line.

A further object is to provide apparatus of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:

The figure is a diagrammatic view showing connections for operating relays embodying one form of the present invention.

In the operation of high voltage relay systems, it has heretofore been usual to install potential and current transformers to operate the several different types of relays. The use of high voltage bushings having current transformers and capacitance or condenser couplings with step-down transformers, as shown in my prior Patents #1,709,826 and 1,723,000, makes it possible to operate the relays without additional potential or current transformers. This has considerable advantage particularly for very high voltage lines where the cost of potential and current transformers is high, and an increasing hazard is caused by their use.

In order to eliminate the necessity of potential transformers and to provide the necessary energy for the operation of relays, the present invention provides a new arrangement of apparatus which has several advantages, in addition to lower cost. While the invention utilizes transformers supplying the necessary potential to relays, the transformers are energized by electrostatic condensers. The electrostatic condenser coupling may be provided either by special electrostatic condensers designed for the purpose or by using electrostatic couplings of bushings. The arrangement is particularly applicable to circuit breakers in which the bushings are equipped with current transformers and capacitance couplings.

In the arrangement shown in the figure, the several phases of the high voltage transmission line are shown by A, B and C. Taps 1, 2 and 3 from the several phases of the high voltage line are arranged to pass through circuit breakers 4, 5 and 6, respectively, which can be used for disconnecting from the line. The bushings 7, 8 and 9 are each equipped with a current transformer 10, the secondaries 11 of which are used to furnish current for motor type relays 12, 13 and 14 or other apparatus as shown in the drawing. In order to supply potential to the potential coils of the several relays, step-down transformers having primaries 15, 16 and 17 are used connected to the capacitance couplings 18 for the several phases. These primaries are protected from transients by limiting gaps or lighting arresters 19, as shown in my prior Patent #1,709,826 referred to above. The secondaries of the transformer 15, 16 and 17 are connected to the relays 12, 13 and 14, respectively, as shown in the diagram; the potential being regulated by impedances 20. The phase angle of the secondary circuit may be regulated by either series or shunt impedances 21 and 22 as more fully explained in my prior application #433,921, filed March 7, 1930. While one terminal of the primary of each of the step-down transformers 15, 16 and 17 is connected to the capacitance coupling provided by its bushing, the other terminal, in place of being grounded, is connected to a common bus 23. This bus in turn is used to energize the primary 24 of the transformer 25. The secondary 26 of the transformer 25 is used to energize the potential coil of a motor type relay 27. With this there is little or no potential on the primary 24 under normal operating conditions although the several relays 12, 13 and 14 may be supplied with a potential from the secondaries of the transformers 15, 16 and 17 as shown. The potential supplied to the potential coils of each of the relays 12, 13 and 14 will normally be approximately in phase with that supplied to the current coils from the secondaries of transformers 11, as the normal phase angle of the potential of the secondaries of these transformers is approximately in phase with the current and potential of their respective taps 1, 2 and 3. If, however, a different phase relation is desired, this may be obtained by energizing the potential coil of any relay 12, 13 or 14 from a tap 1, 2 or 3 of one phase and the current coil of the same relay from another tap. It is understood that the phase relation of the secondaries 11 may be changed by the use of suitable series or shunt impedances or a combination of same, as explained in my prior application referred to above. Under normal conditions where the potentials of the phases A, B and C are balanced relative to ground potential as where the energizing generator is provided with a grounded neutral and the conductors are equally insulated from ground, the transformers 15, 16 and 17 can be expected to deliver much less potential and energy to the residual ground relay 27 than where an open delta is used for operating such a ground relay, due to the effect of a third harmonic but in case of an abnormal unbalanced condition between the phases of the transmission line, with the arrangement of apparatus shown, the transformers 15, 16 and 17 will deliver much more energy than where an open delta, provided by the secondaries of 15, 16 and 17, is used to supply energy to the residual ground relay 27. The energy supplied to the residual ground relay under unbalanced conditions of the line, with the scheme shown in the drawing, is found in practice to be several times that supplied where the open delta scheme is used to supply the energy. In addition, the results are accomplished with the use of four step-down transformers having primary voltages relatively smaller than that of the transmission line.

With the arrangement shown, the entire energy of the secondary of the step-down transformers 15, 16 and 17 is available for relays 12, 13 and 14 or other equipment under normal operating conditions, as no energy flows to the step-down transformer 27 except when the line voltage is unbalanced due to ground or short-circuit. Also, the phase angle of the potential from the secondary of the transformer 25 is such as to provide a good torque for the operation of the relay 27. This phase angle may be varied appreciably by the use of shunt or series impedance 28 and 29 or a combination of the two, as explained in my prior application referred to above.

The arrangement consists fundamentally of step-down transformers applied to capacitance couplings from the several phases, the secondaries of which are used to energize relays or other apparatus. One side of the primaries of the step-down transformers, however, are connected to a neutral or common bus which is insulated so that it may be used to energize a transformer for an unbalanced potential condition for the several phases, the energy from the secondaries of this transformer being used to operate relays or other suitable apparatus.

I claim:

1. The combination with a polyphase transmission line, of circuits having electrostatic couplings with the respective phases of said line and being connected to a common neutral, electrical translating devices electrically connected in said circuits between said common neutral and the respective phases of said line, and an electrical translating device electrically connected between said common neutral and ground.

2. The combination with a polyphase transmission line, of potential transformers each having one terminal thereof connected with one phase of said transmission line by means of an electrostatic coupling, the other terminals of said transformers being connected to a common neutral, and an additional transformer having one terminal thereof connected to said common neutral and the other terminal thereof connected to ground.

3. The combination with a transmission line, of a circuit having an electrostatic coupling with said line, a circuit having electromagnetic couplings with said line, and an electrical translating device supplied with energy from both of said circuits.

4. The combination with a polyphase transmission line, of circuits having electrostatic couplings with the respective phases of said line and having a common neutral, circuits having electromagnetic couplings with the respective phases of said line and having a common neutral, and an electrical translating device electrically connected with both of said common neutrals.

5. The combination with a polyphase transmission line, of potential transformers each having one terminal thereof connected by an electrostatic coupling with one phase of said line, said transformers having the other terminals thereof electrically connected to a common neutral, relays each having one winding thereof supplied with energy from the secondaries of said respective transformers, each of said relays having an additional winding connected by means of an electromagnetic coupling each to one phase of said transmission line.

6. The combination with a polyphase transmission line, of branch circuits connected with the respective phases of said line, potential transformers each having a primary terminal electrostatically connected with one of said circuits, the other primary terminals of said transformers being connected to a common neutral, relays each having one winding energized by the secondary of one of said transformers, circuit breakers for said branch circuits controlled by said relays respectively, and current transformers energized by said respective branch circuits, said relays each having windings energized each by one of said current transformers.

7. The combination with a polyphase transmission line, of a branch circuit connected with each phase of said line and having a cut-out switch therein, relays for controlling said respective switches, current transformers energized by said respective branch circuits and each supplying current to one winding of one of said relays, potential transformers each supplying current to another winding of one of said relays, electrostatic couplings connecting one terminal of the primary of each of said transformers each to one of said potential branch circuits, the other terminals of said primaries being connected to a common neutral.

8. The combination with a polyphase transmission line, of a cut-out switch for controlling said line, a relay for controlling said cut-out switch, circuits having electrostatic couplings with the respective phases of said transmission line, said circuits being connected to a common neutral, a transformer having its primary electrically connected between said common neutral and ground, the secondary of said transformer being electrically connected to one winding of said relay, current transformers energized by the respective phases of said transmission line, said current transformers having one terminal of the secondary of each connected to a common electrode, the other terminals of the secondaries of said current transformers being also connected to a common electrode, said relay having a winding electrically connected between said common electrodes.

9. The combination with a polyphase transmission line, of a cut-out switch for controlling said line, branch circuits connected with each phase of said line, each branch circuit having a cut-out switch therein, potential transformers each having a terminal of the primary thereof electrostatically connected with one of said branch circuits, the other primary terminals of said potential transformers being connected to a common neutral, a relay for controlling the cut-out switch in each of said branch circuits, each of said relays having one winding there- of energized by one of said potential transformers, a relay for controlling the cut-out switch for said transmission line, and a potential transformer for energizing said last-named relay, said last-named potential transformer having one terminal of the primary thereof electrically connected with said common neutral and having the other terminal thereof grounded.

10. The combination with a polyphase transmission line, a main cut-out switch for controlling said line, a main relay for controlling said switch, branch circuits from the respective phases of said line, supplemental switches for controlling said branch circuits, supplemental relays for controlling said supplemental switches, supplemental potential transformers each having a primary terminal electrostatically connected with one of said branch circuits, the other primary terminal of said supplemental potential transformers being connected to a common neutral, the secondary windings of said supplemental potential transformers each being electrically connected to energize one winding of one of said supplemental relays, a main potential transformer having its primary winding electrically connected between said common neutral and ground, the secondary winding of said main potential transformer being electrically connected to energize one winding of said main relay, a current transformer energized by each of said branch circuits, each of said current transformers having one terminal thereof connected through a winding of one of said supplemental relays to a common bus, the other terminal of each of said current transformers being grounded, said main relay having one terminal of a winding thereof electrically connected to said common bus, the other terminal of said winding being grounded.

In testimony whereof I have signed my name to this specification this 23rd day of February A. D. 1931.

ARTHUR O. AUSTIN.